(12) United States Patent
Levesque

(10) Patent No.: US 10,359,857 B2
(45) Date of Patent: Jul. 23, 2019

(54) USABLE HIDDEN CONTROLS WITH HAPTIC FEEDBACK

(71) Applicant: IMMERSION CORPORATION, San Jose, CA (US)

(72) Inventor: Vincent Levesque, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 13/945,498

(22) Filed: Jul. 18, 2013

(65) Prior Publication Data

US 2015/0022466 A1 Jan. 22, 2015

(51) Int. Cl.
*G06F 3/041* (2006.01)
*G08B 6/00* (2006.01)
(Continued)

(52) U.S. Cl.
CPC .............. *G06F 3/017* (2013.01); *G06F 3/016* (2013.01); *G06F 3/041* (2013.01); *G06F 3/04883* (2013.01); *G06F 21/31* (2013.01); *G06F 21/32* (2013.01); *G06F 21/35* (2013.01); *G07C 9/00563* (2013.01); *H04W 12/06* (2013.01);
(Continued)

(58) Field of Classification Search
CPC .......... G06F 3/041; G06F 3/042; G06F 3/044; G06F 3/045; G06F 3/00; G06F 3/01; G06F 3/03; G06F 3/033; G06F 3/048; G06F 3/0484; G06F 3/0487; G06F 3/04817; G06F 7/04; G01R 27/26; G09B 7/10; G09B 13/00; G09B 13/08; G09B 13/26; G09B 5/00; G09B 6/00; G09B 23/00; G09B 25/00; H04Q 9/00; A61M 27/00; A61F 13/02; H04N 7/18; A63F 11/00; H01H 9/00; H05B 3/02; B64D 11/00; E06B 7/10; H05K 7/02; B60R 25/00; B60R 25/10; B62B 1/00; H02B 1/40; H03K 17/94; H03M 11/00; G08C 21/00; G06K 11/16;
(Continued)

(56) References Cited

U.S. PATENT DOCUMENTS 8,854,433 B1 * 10/2014 Rafii .............................. 348/47
2002/0043024 A1 4/2002 Tanaka
(Continued)

FOREIGN PATENT DOCUMENTS

DE 20 2012 005 255 U1 8/2012
WO WO 2012/159254 A1 11/2012

OTHER PUBLICATIONS https://www.youtube.com/watch?v=NudpFAEi6S0 (Blue Sparq, Inc., "Secret Capacitive Touch Switches", Published on Mar. 1, 2012).*
Extended Search Report as issued in European Patent Application No. 14177469.5, dated Mar. 9, 2015.

*Primary Examiner* — Chanh D Nguyen
*Assistant Examiner* — Nguyen H Truong
(74) *Attorney, Agent, or Firm* — Miles & Stockbridge P.C.

(57) ABSTRACT

A system configured to activate a hidden control includes a sensor configured to sense an input by a user. The input includes a gesture. The system includes a haptic output device configured to output a haptic feedback as the input is being sensed, and a processor configured to determine if the sensed input corresponds to a predetermined gesture associated with activation of a control, and if the sensed input corresponds to the predetermined gesture to activate the control.

17 Claims, 8 Drawing Sheets

(51) Int. Cl.
*G08B 13/08* (2006.01)
*G06F 3/01* (2006.01)
*G06F 21/31* (2013.01)
*G06F 3/0488* (2013.01)
*G06F 21/32* (2013.01)
*G06F 21/35* (2013.01)
*H04W 12/06* (2009.01)
*G07C 9/00* (2006.01)
*H04L 29/06* (2006.01)
*H04W 4/80* (2018.01)
*H04W 12/00* (2009.01)

(52) U.S. Cl.
CPC . *G07C 9/00174* (2013.01); *G07C 2009/0019* (2013.01); *G07C 2009/00095* (2013.01); *G07C 2009/0096* (2013.01); *G07C 2209/65* (2013.01); *H04L 63/0853* (2013.01); *H04L 63/0861* (2013.01); *H04W 4/80* (2018.02); *H04W 12/00508* (2019.01)

(58) Field of Classification Search
CPC .. H04M 1/67; G07C 9/00; G09G 5/00; G10L 15/20
See application file for complete search history.

(56) References Cited

U.S. PATENT DOCUMENTS

| | | |
|---|---|---|
| 2002/0109677 A1* | 8/2002 | Taylor ............... G06F 3/0233 345/173 |
| 2007/0126561 A1 | 6/2007 | Breed |
| 2007/0236450 A1 | 10/2007 | Colgate et al. |
| 2008/0068334 A1* | 3/2008 | Olien ................ G06F 3/016 345/156 |
| 2010/0103116 A1* | 4/2010 | Leung ............... G06F 1/1616 345/173 |
| 2010/0156913 A1* | 6/2010 | Ortega et al. ............. 345/520 |
| 2012/0050685 A1* | 3/2012 | Bartlett et al. ............. 351/223 |
| 2012/0268412 A1 | 10/2012 | Cruz-Hernandez et al. |
| 2013/0181953 A1* | 7/2013 | Hinckley et al. ........... 345/179 |
| 2014/0095994 A1* | 4/2014 | Kim .................. G06F 3/013 715/702 |
| 2014/0160029 A1* | 6/2014 | Yuen ................ G06F 3/04886 345/169 |
| 2014/0197936 A1* | 7/2014 | Biggs ................... G08B 6/00 340/407.1 |
| 2014/0223381 A1* | 8/2014 | Huang ............ G06F 17/30905 715/863 |
| 2014/0267013 A1* | 9/2014 | Grant et al. ................ 345/156 |
| 2015/0002870 A1* | 1/2015 | Burke, Jr. ............. G06F 3/1204 358/1.13 |

* cited by examiner

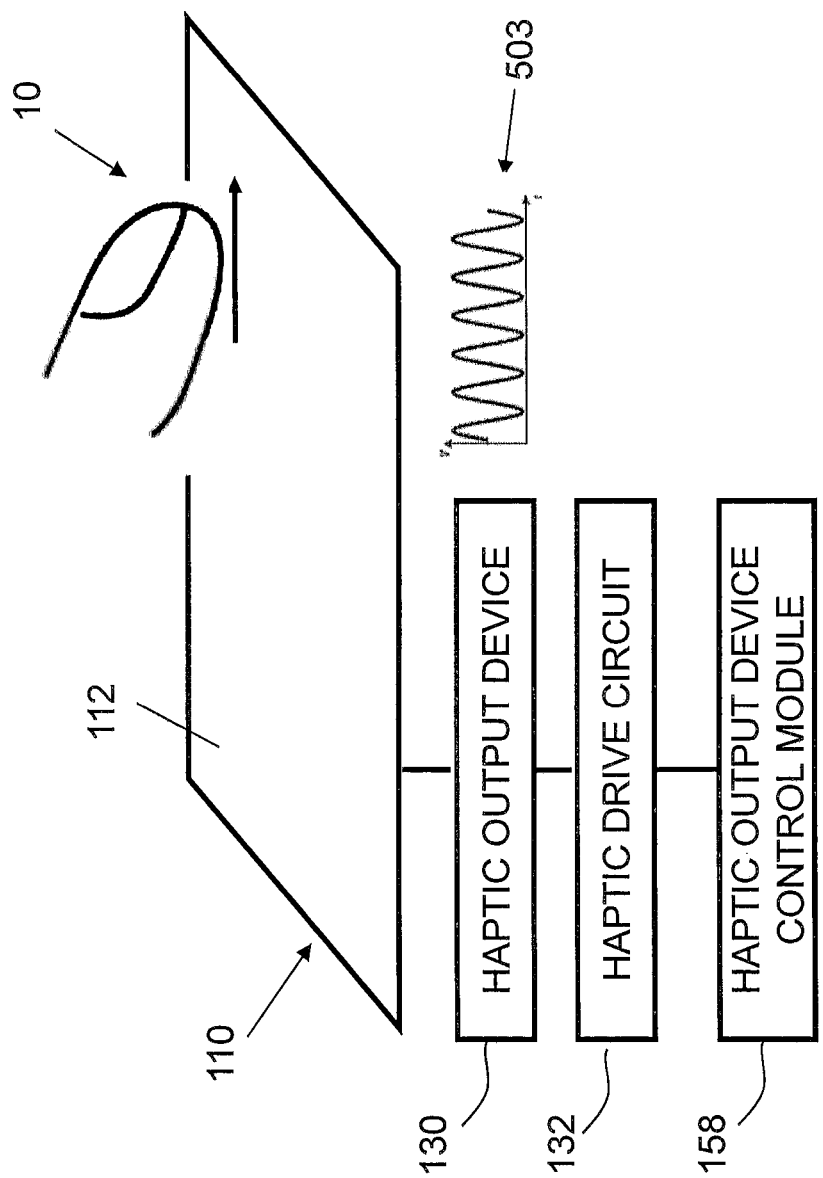

USABLE HIDDEN CONTROLS WITH HAPTIC FEEDBACK

FIELD

The present invention is related to usable hidden controls with haptic feedback.

BACKGROUND

Hidden controls have been used to provide a user control over an action without the knowledge of others. For example, banks use hidden controls to allow employees to initiate silent alarms when threatened. Such hidden controls are typically in the form of a mechanical button that is hidden from view from the public, for example beneath a counter or desk, yet easily located by the employee by feeling the button without having to look at the button.

It is desirable to be able to use hidden controls that are in locations within plain sight of the public, but are still hidden from view. Such hidden controls may allow designers to create aesthetically pleasing minimalist designs with clean lines and surfaces, without compromising usability.

SUMMARY

Aspects of the present invention make it possible to use hidden controls while maintaining a level of usability. The availability of usable hidden controls could make them more appealing for a wide range of applications and devices.

According to an aspect of the invention, there is provided a system configured to activate a hidden control. The system includes a sensor configured to sense an input by a user, the input comprising a gesture, a haptic output device configured to output a haptic feedback as the input is being sensed, and a processor configured to determine if the sensed input corresponds to a predetermined gesture associated with activation of a control, and if the sensed input corresponds to the predetermined gesture to activate the control.

In an embodiment of the system, the control is a lock and activation of the control comprises unlocking the lock.

In an embodiment of the system, the haptic output device includes an actuator.

In an embodiment of the system, the haptic output device includes a non-mechanical or non-vibratory device.

In an embodiment of the system, the haptic output device is configured to generate electrostatic friction or ultrasonic surface friction.

In an embodiment of the system, the system further includes a user identification device configured to determine the user's identity, and the processor is further configured to determine whether the identified user has permission to activate the control, and to activate the control if the user is determined to have permission to activate the control.

In an embodiment of the system, the user identification device is configured to sense a radio frequency identification tag.

In an embodiment of the system, the user identification device includes a biometric sensor.

In an embodiment of the system, the haptic output device is configured to generate a second haptic effect if the user is determined to have permission to activate the control, and the second haptic effect is generated to identify the location of the touch surface for the user to apply the gesture.

In an embodiment of the system, the second haptic effect includes electrostatic friction or ultrasonic surface friction.

According to an aspect of the invention, there is provided a method for activating a hidden control. The method includes sensing a gesture applied to a touch surface by a user, generating haptic feedback to the user as the gesture is being sensed, determining whether the sensed gesture corresponds to a predetermined gesture associated with activation of a control, and activating the control if the sensed gesture is determined to correspond to the predetermined gesture associated with activation of the control.

In an embodiment of the method, the control is a lock and said activating the control comprises unlocking the lock.

In an embodiment of the method, the haptic feedback is generated with a haptic output device.

In an embodiment of the method, the haptic feedback includes a vibration.

In an embodiment of the method, the haptic feedback includes electrostatic friction or ultrasonic surface friction.

In an embodiment of the method, the method further includes determining the user's identity, determining whether the identified user has permission to activate the control, and activating the control if the user is determined to have permission to activate the control.

In an embodiment of the method, the user's identity is determined by detecting a radio frequency identification tag within a vicinity of the hidden control.

In an embodiment of the method, the user's identify is determined with a biometric sensor.

In an embodiment of the method, the method further includes generating a second haptic feedback if the user is determined to have permission to activate the control, and the second haptic effect is generated to identify the location of the touch surface for the user to apply the gesture.

In an embodiment of the method, the second haptic feedback includes electrostatic friction or ultrasonic surface friction.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

FIGS. 5A and 5B schematically illustrate a portion of the system of FIG. 1, in accordance with embodiments of the invention;

DETAILED DESCRIPTION

Figure 1:
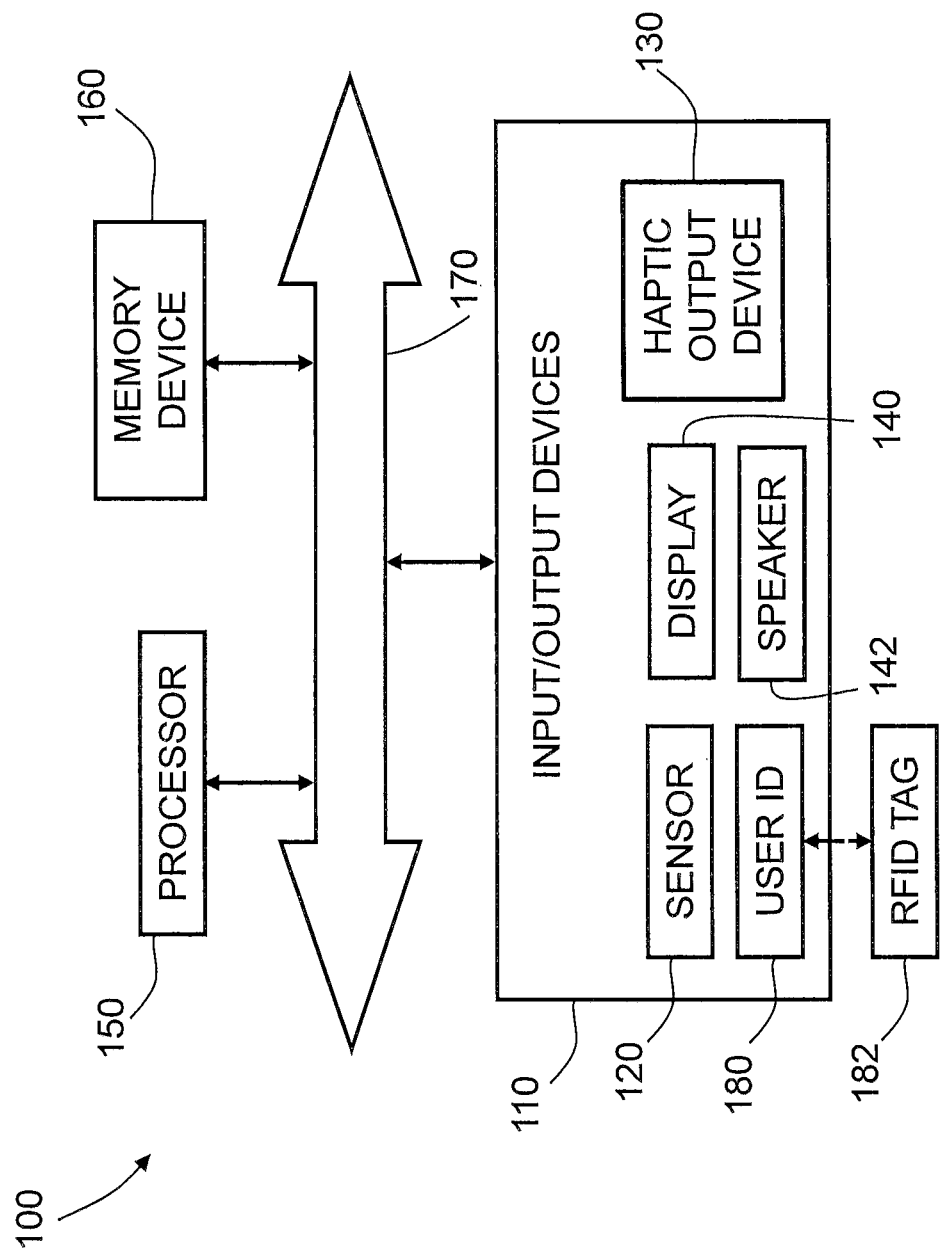
FIG. 1 schematically illustrates a system for providing and activating a hidden control in accordance with embodiments of the invention.

FIG. 1 is a schematic illustration of a system 100 in accordance with embodiments of the present invention. As illustrated, the system 100 includes an input/output device 110, which is in the form of a hidden control that is configured to be invisible or substantially invisible to the human eye. The hidden control 110 may be a physical or virtual control, such as a button, a latch, and/or a lock, as described in further detail below. The hidden control 110 includes a sensor 120 configured to sense an input of a user, a haptic output device 130 configured to output a haptic feedback to the user, and may optionally include a display 140, an audio output device, such as a speaker 142, and a user identification device 180.

The sensor 120 may be a touch sensor configured to detect gestures or manipulations of the hidden control, such as tapping, sliding, rubbing, or pressing a surface of the hidden control 110, or dragging an object, such as a finger or stylus, against the surface of the hidden control 110. The touch sensor may also be configured to support the rendering of haptic effects, such as the modulation of friction effects as a finger slides against a hidden control, as discussed in further detail below with respect to the haptic output device 130, which may be integrated with the sensor 120 or separate from the sensor 120. Several technologies may be used for this purpose, such as capacitive or resistive sensing, force-sensitive resistors, or optical switches, for example.

The haptic output device 130 is configured to provide haptic feedback to at least a portion of the hidden control 110, which can be conveyed to a user in contact with the hidden control 110. The haptic feedback generated by the haptic output device 130 may take several forms. For example, the location of the hidden control 110 may be marked with a haptic effect. A haptic effect could, for example, be triggered when entering or leaving the control, such as a friction impulse or a vibrotactile effect. A continuous or semi-continuous effect could also be played while contacting the hidden control, such as a friction texture or a continuous vibration. In an embodiment, the operation of the hidden control 110 may be augmented with haptic effects. Detents, for example, may be produced while moving a simulated dial or button. Confirmation effects may also be played when an operation is completed, such as when a latch has been released.

The haptic feedback may be created with any method of creating a haptic effect, such as vibration, deformation, kinesthetic sensations, electrostatic or ultrasonic friction, etc. The haptic output device 130 may include one or more actuators, driving circuitry, and a haptic engine configured to generate driving signals for the actuator(s). The haptic output device 130 may use a variety of surface haptic technologies such as friction displays, vibrotactile actuators, and/or electrotactile arrays, etc.

For example, in an embodiment, the haptic output device 130 may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric materials, electro-active polymers or shape memory alloys, a macro-composite fiber actuator, an electro-static actuator, an electro-tactile actuator, and/or another type of actuator that provides a physical feedback such as a haptic (e.g., vibrotactile) feedback. The haptic output device 130 may include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on. In an embodiment, multiple haptic output devices may be used to generate different haptic effects.

In an embodiment, the haptic output device 130 may be configured to produce haptic feedback without an electro-mechanical device. For example, a different material may be used for the surface of the hidden control 110 such that its texture feels different from the surfaces surrounding the hidden control 110 but the material providing the texture visually appears the same as the surrounding surface material.

The haptic feedback provided by the haptic output device 130 may be used to mark the location of the hidden control 110. For example, a hidden virtual button may have a texture produced by a friction display that makes it easier to find on an otherwise featureless surface. The haptic output device 130 may provide haptic feedback to confirm that the hidden control 110 is responding to the touch provided by the user or that the function that the hidden control 110 controls has been activated. For example, a hidden virtual latch may produce a vibration cue as the latch is moved to open a door. As discussed in further detail below, these haptic effects provided by the haptic output device 130 may be altered as a function of the state of the system 100. For example, location or confirmation cues may be disabled unless certain credentials, such as a radio frequency identification ("RFID") tag or badge with certain permissions, has been detected. Similarly, a hidden button that is currently unavailable to operate may be marked with a different friction texture.

The hidden control 110 may optionally include a display 140 that is configured to provide a visual signal to the user. The display 140 may be configured to illuminate or glow or may be configured to display an image when the user touches the hidden control 110 to activate the hidden control 110. In an embodiment, the sensor 120 and the display 140 may be combined into a touch screen. The hidden control 110 may include an audio output device, such as a speaker 142, that is configured to provide audio feedback when the user touches the hidden control 110 to activate the hidden control 110.

As illustrated, the system 100 also a processor 150 and a memory device 160 which are interconnected to the hidden control 110 via a bus 170. In an embodiment, the processor 150, memory device 160, and bus 170 may be part of the hidden control 110.

The processor 150 may be a general-purpose or specific-purpose processor or microcontroller for managing or controlling the operations and functions of the system 100. For example, the processor 150 may be specifically designed as an application-specific integrated circuit ("ASIC") to control output signals to the haptic output device 130 to provide haptic effects. The processor 150 may be configured to decide, based on predefined factors, what haptic effects are to be generated based on a haptic signal received or determined by the processor 150, the order in which the haptic effects are generated, and the magnitude, frequency, duration, and/or other parameters of the haptic effects. The processor 150 may also be configured to provide streaming commands that may be used to drive the haptic output device 130 for providing a particular haptic effect. In some embodiments, the processing device 150 may include a plurality of processors, each configured to perform certain functions within the system 100. The processor 150 may be embedded in the hidden control 110 or may be embedded in a remote computer, such as on a centralized server. The processor 150 is described in further detail below.

The memory device 160 may include one or more internally fixed storage units, removable storage units, and/or remotely accessible storage units. The various storage units may include any combination of volatile memory and non-volatile memory. The storage units may be configured to store any combination of information, data, instructions, software code, etc. More particularly, the storage units may include haptic effect profiles, instructions for how the haptic output device 130 of the hidden control 110 is to be driven, or other information for generating haptic effects.

The user identification device 180 may be a device that is associated with an authorized user of the hidden control 110 and may communicate with, for example, a radio frequency identification ("RFID") tag 182 that is carried by the user so that when the user approaches the hidden control, the signal output by the RFID tag 182 may be detected by the user identification device 180 and used to determine whether or not the user carrying the RFID tag 182 is authorized to activate the hidden control 110, as discussed in further detail below. In an embodiment, the user identification device 180 may include a biometric sensor, such as a fingerprint sensor, an iris or retinal scanner, etc., that is configured to identify the user. In an embodiment, the user identification device 180 may include an image capturing device, such as a camera, configured to capture an image of the user's face or images that capture the user's gait, or any other image(s) that may be used to determine whether the user is authorized to activate the hidden control 110.

Figure 2:
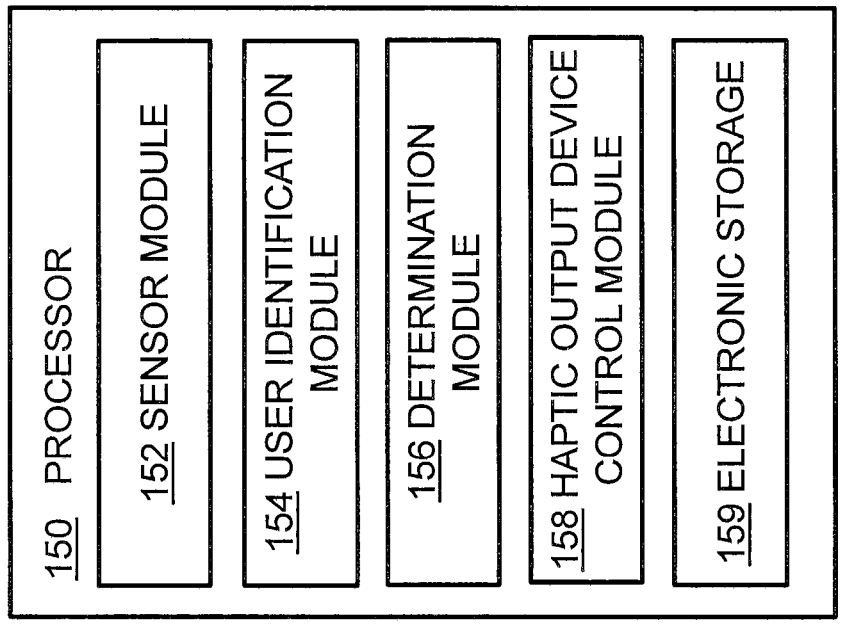
FIG. 2 schematically illustrates a processor of the system of FIG. 1.

FIG. 2 illustrates an embodiment of the processor 150 in more detail. The processor 150 may be configured to execute one or more computer program modules. The one or more computer program modules may include one or more of a sensor module 152, a user identification module 154, a determination module 156, a haptic output device control module 158, and/or other modules. The processor 150 may also include electronic storage 159, which may be the same as the memory device 160 or in addition to the memory device 160. The processor 150 may be configured to execute the modules 152, 154, 156, and/or 158 by software, hardware, firmware, some combination of software, hardware, and/or firmware, and/or other mechanisms for configuring processing capabilities on processor 150.

It should be appreciated that although modules 152, 154, 156, and 158 are illustrated in FIG. 2 as being co-located within a single processing unit, in embodiments in which the processor 150 includes multiple processing units, one or more of modules 152, 154, 156, and/or 158 may be located remotely from the other modules. The description of the functionality provided by the different modules 152, 154, 156, and/or 158 described below is for illustrative purposes, and is not intended to be limiting, as any of the modules 152, 154, 156, and/or 158 may provide more or less functionality than is described. For example, one or more of the modules 152, 154, 156, and/or 158 may be eliminated, and some or all of its functionality may be provided by other ones of the modules 152, 154, 156, and/or 158. As another example, the processor 150 may be configured to execute one or more additional modules that may perform some or all of the functionality attributed below to one of the modules 152, 154, 156, and/or 158.

The sensor module 152 is configured to receive an input signal from the sensor 120 that is generated when the sensor 120 detects an input from a user. The sensor module 152 is further configured to determine whether the input signal received from the sensor 120 is indicative of a user trying to operate the hidden control 110 or whether the sensed input from the user was merely an incidental touch of the hidden control 110. If the sensor module 152 determines that the input signal corresponds to a mere incidental touch and not an intentional gesture or manipulation of the hidden control 110 because the sensed input did not exceed a predetermined threshold value, the sensor module 152 may be programmed to ignore the input signal so that no further action is taken.

The user identification module 154 is configured to receive a signal from the user identification device 190 and determine whether the signal indicative of the user matches a preprogrammed user identification indicating that the user is authorized to operate the hidden control 110, as discussed in further detail below.

The determination module 156 is configured to receive an input signal from the sensor module 152 to determine whether the hidden control 110 should be operated based on the received signals. In an embodiment, the determination module 156 is configured to execute a method 300 illustrated in FIG. 3. The method 300 starts at 302. At 304, the sensor 120 senses a touch by a user at the location of the hidden control 110. At 306, the determination module 156 determines whether the touch that was sensed by the sensor 120 matches a predetermined gesture that indicates that the hidden control 110 should be actuated. The predetermined gesture may be preprogrammed into the processor and may reside in a library of preprogrammed gestures, or the user may be able to program predetermined gestures by running the determination module 156 in a teach mode and assign different gestures to different functions provided by the processor 150.

Figure 3:
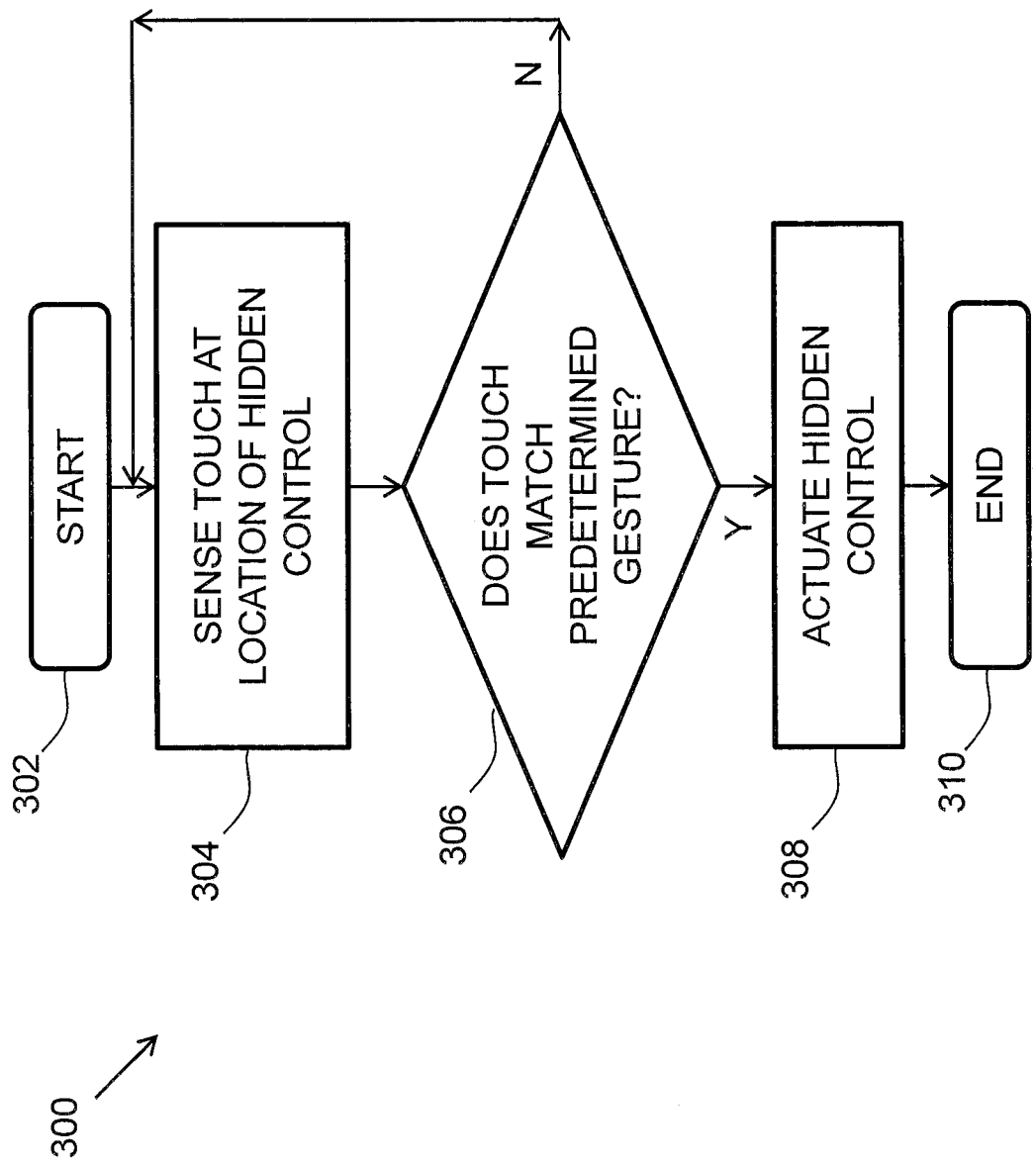
FIG. 3 schematically illustrates a method for sensing a gesture for operating the hidden control of FIG. 1.

Returning to the method 300 of FIG. 3, if the touch that was sensed by the sensor 120 does not match the predetermined gesture, the method 300 returns to 304. If the touch that was sensed by the sensor 120 does match the predetermined gesture, the method proceeds to 308 and the determination module 156 sends a signal to actuate the hidden control 110. For example, when the hidden control 110 controls a lock, the signal that is sent by the determination module 156 causes actuation of the lock so that the lock moves from a locked condition to an unlocked condition, or vice-versa. The method 300 ends at 310. In an embodiment, the sensor module 152 may be configured to execute at least a portion of the method 300 illustrated in FIG. 3. For example, steps 302-306 may be executed by the sensor module 152 and steps 308-310 may be executed by the determination module 156. In an embodiment, the entire method 300 of FIG. 3 may be executed by the sensor module 152.

In an embodiment, the determination module 156 may be configured to receive an input signal from the user identification module 154 to determine whether the hidden control 110 should be operated based on the received signal. For example, the determination module 156 may be programmed with a predetermined list of authorized users and each authorized user may have a distinct signal associated therewith. In an embodiment, the determination module 156 is configured to execute a method 400 illustrated in FIG. 4. The method 400 starts at 402. At 404, a user identification signal is sensed by the user identification device 180 and the user identification device 180 outputs an input user signal to the determination module 156. Upon receipt of the input user signal, which corresponds to a user who has approached the hidden control 110 and/or attempted to manipulate the hidden control 110, from the user identification module 154, a comparison between the input user signal and the predetermined user identification signals that that correspond to the predetermined list of authorized users may be made by the determination module 156 at 406.

If the input user signal matches one of the predetermined user identification signals, the determination module 156 may provide a signal to the haptic output control module 158 indicating that the haptic output device control module 158 should proceed with determining a haptic effect to be generated by the haptic output device 130 at 408. If the input user signal does not match one of the predetermined user identification signals that corresponds to the predetermined list of authorized users, the method ends at 410 or the determination module 156 provides a signal to the haptic output device module 158 indicating that the haptic output device control module 158 should not determine a haptic effect to be generated by the haptic output device 130 at 412 before the method ends at 410, depending on how the determination module 156 is programmed. In other words, if the input user signal does not match one of the predetermined user identification signals corresponding to an authorized user, no haptic effect will be generated, and the location of the hidden control 110 may remain undetectable.

Figure 4:
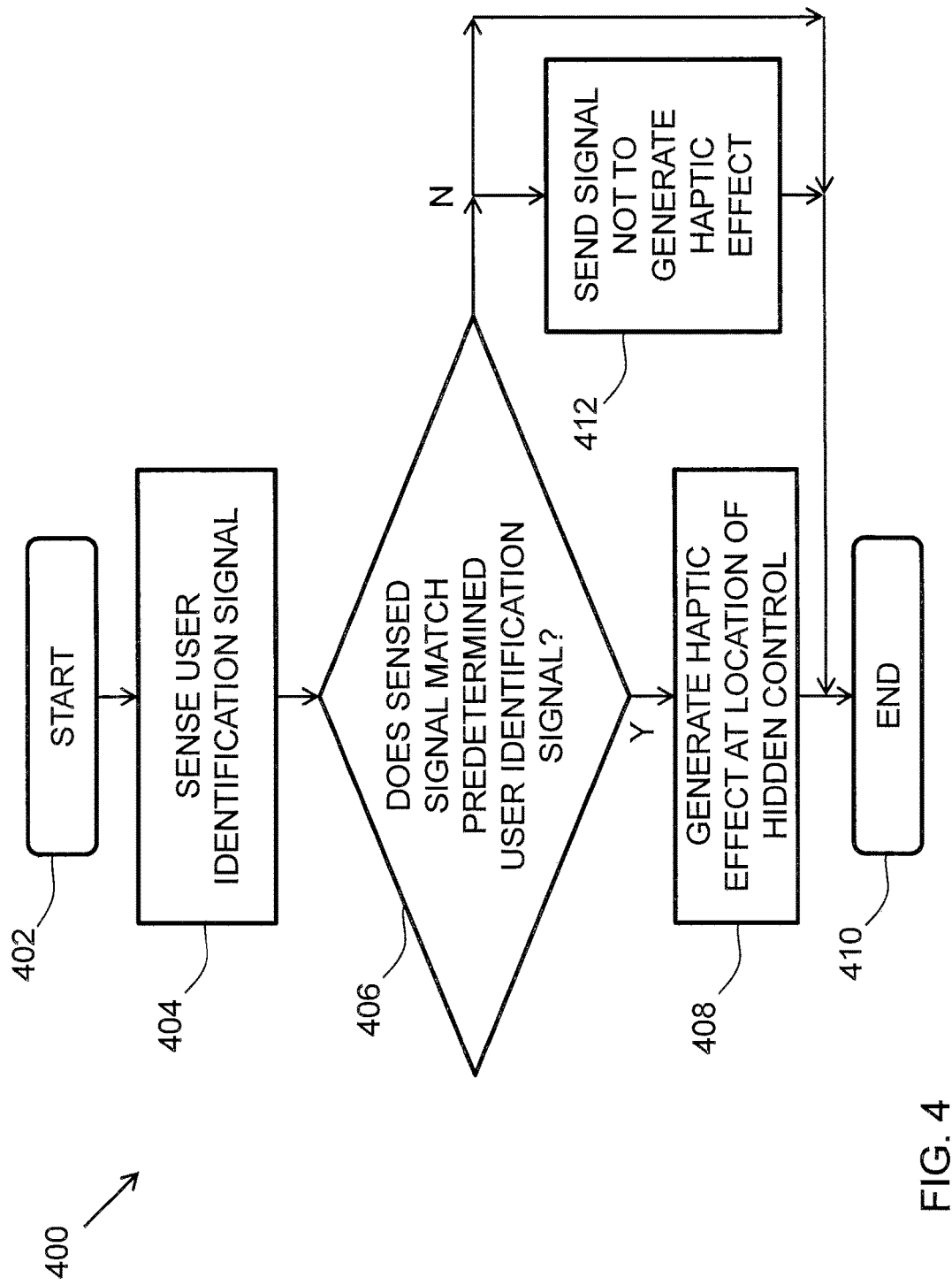
FIG. 4 schematically illustrates a method for identifying an authorized user of the system of FIG. 1.

In an embodiment, the determination module 156 may be programmed to run the method 400 of FIG. 4 before running the method 300 of FIG. 3 and if the determination module 156 determines that the user is not an authorized user, the method 300 may not start at 302, even if the user touches the location of the hidden control 110 and provides the correct predetermined gesture. In other words, for security purposes, the hidden control 110 may remain hidden to the user by not providing haptic feedback or actuation of the control if the user is not authorized to operate the hidden control 110. This extra layer of security is considered to be optional, and the determination module 156 may be configured to execute the method 300 of FIG. 3 and not the method 400 of FIG. 4. In an embodiment, the user identification module 154 may be configured to execute at least a portion of the method 400 of FIG. 4. For example, steps 402-406 may be executed by the user identification module 154 and steps 408-412 may be executed by the determination module 156. In an embodiment, the entire method 400 may be executed by the user identification module 154.

The haptic output device control module 158 is configured to determine the haptic effect to be generated by the haptic output device 130, based on a signal generated by the determination module 156. Determining the haptic effect may include determining one or more parameters that include an amplitude, frequency, duration, etc., of the haptic effect that will enhance one or more aspects of the experience provided by the content to the user.

Figure 5A:
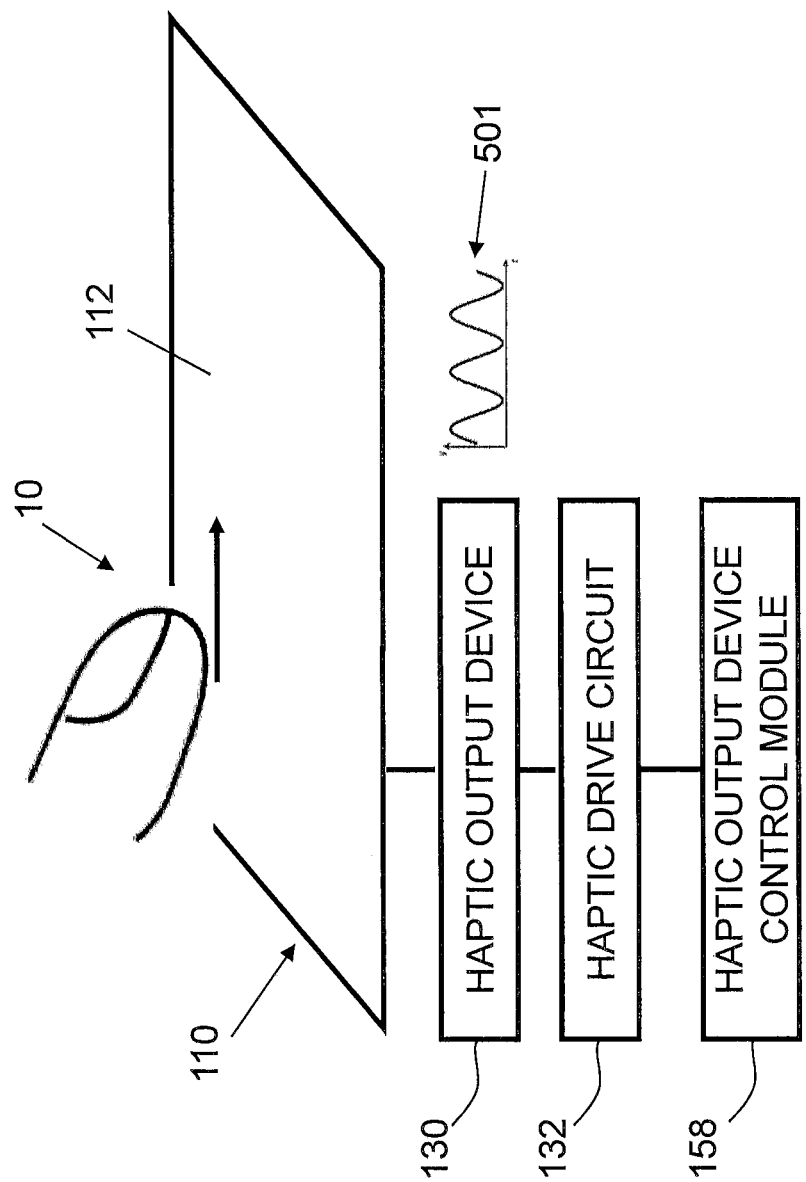

FIG. 5A illustrates an embodiment of the haptic output device 130 configured to generate a haptic effect at a surface 112 of the hidden control 110. The haptic effect may be generated to simulate a feature, such as a surface feature, represented by the hidden control 110. For example, the simulated surface feature may be a simulated texture, spatial pattern, edge or border, or any other tactile sensation, whether natural or artificial, at surface 112. The spatial pattern may include a grid of straight lines, a grid of concentric circles, a grid of points, a grid of tiles, any combination thereof, or any other spatial pattern.

In the illustrated embodiment, the haptic output device 130 may be operatively coupled to a haptic drive circuit 132 configured to apply a drive signal to the haptic output device 130. The haptic drive circuit 132 may comprise an amplifier configured to amplify or buffer a signal from the haptic output device control module 158. In an embodiment, the haptic drive circuit 132 may be omitted, and the haptic output device control module 158 may output a signal directly to the haptic output device 130.

In an embodiment, the haptic output device control module 156 and the haptic output device 130 may be configured to simulate surface features at the surface 112 by controlling a level of friction. For example, the haptic output device 130 including an actuator may control the level of friction by generating vibrations at the surface 112. The haptic output device 130 including an electrostatic device may control a level of friction through applying a voltage to or underneath the surface 112. An alternating voltage signal, for example, may create a capacitive effect that attracts the user's finger 10, a stylus, or any other object at the surface 112. The attractive force at the surface may be perceived as friction as the object moves across the surface. Increasing the attractive force may increase a level of friction at the surface.

Controlling friction through a haptic effect is discussed in more detail in U.S. patent application Ser. No. 13/092,269, titled "Electro-vibrotactile Display," filed Apr. 22, 2011, and published on Oct. 25, 2012 as United States Patent Application Publication No. 2012/0268412, the entire content of which is incorporated herein by reference. As described in that application, an electrostatic device may, in an embodiment, be used with a surface that includes a conductive layer having one or more electrodes and that includes an insulating layer. The conducting layer may be any semiconductor or other conductive material. The insulating layer may be glass, plastic (e.g., thermoplastic), polymer, or any other insulating layer. The electrostatic device may operate by applying an AC signal that, in an embodiment, capacitively couples the conducting layer with an object near or touching the surface 112. The AC signal may be generated by a high-voltage amplifier located in the haptic drive circuit 132.

The capacitive coupling may control a level of friction on the surface 112. In an embodiment, a surface feature may be simulated by controlling the level of friction on the surface 112. Varying the levels of attraction between the object and the conducting layer can vary the friction on an object moving across the surface 112. A region having a different level of friction than surrounding regions may represent a spatial pattern component, a texture, or any other surface feature. The capacitive coupling may also generate a haptic effect by stimulating parts of the object near or touching the surface 112, such as mechanoreceptors in the skin of a user's finger(s). In an embodiment, the conducting layer may be applied with an AC voltage signal that couples with conductive parts of a user's finger. As the user moves his or her finger on the surface 112 at the location of the hidden control 110, the user may sense a texture of prickliness, graininess, bumpiness, roughness, stickiness, or some other texture. In an embodiment, the surface 112 may not have an insulating layer, so that an object can directly touch the conducting layer. A haptic effect may be generated by applying a voltage from the conducting layer to the object through an electrically conductive path. Simulating a texture through a periodic or other haptic effect is discussed in more detail in U.S. patent application Ser. No. 13/665,526, titled "Method and Apparatus for Simulating Surface Features on a User Interface with Haptic Effects," filed Oct. 31, 2012, the entire content of which is incorporated herein by reference.

In an embodiment, the haptic output device control module 156 may be configured to cause the haptic output device 130 to generate a periodic haptic effect. FIG. 5A, for example, illustrates a periodic haptic effect based on a haptic drive signal 501. In some instances, the haptic drive signal 501 may be a periodic drive signal. In some instances, haptic drive signals may represent haptic effects generated by haptic output devices. For example, if the haptic output device 130 includes an electrostatic device, a haptic effect based on the haptic drive signal 501 may include a sinusoidal AC voltage that has a frequency and amplitude matching or proportional to the haptic drive signal 501. If the haptic output device 130 includes an actuator, a haptic effect based on the haptic drive signal 501 may include a vibration that that has a frequency and amplitude matching the haptic drive signal 501. The periodic haptic effect may vary according to a sinusoidal waveform, as illustrated in FIG. 5A, a square, triangular, or sawtooth waveform, or any other periodic waveform. For example, a periodic electrostatic effect may be generated by an AC voltage having a sinusoidal, square, triangular, sawtooth, or any other waveform.

In an embodiment, the haptic output device control module 156 may cause the haptic output device 130 to alter the haptic effect as the user applies a gesture to the hidden control 110 to assist in guiding the user to apply the correct gesture. FIGS. 5A-5B illustrate, for example, altering a frequency of a periodic haptic effect as the user's finger 10, or any other object creating a touch input, moves across the surface 112. For example, as illustrated in FIG. 5B, the haptic drive signal may be altered so that a haptic drive signal 503 having a greater frequency as compared to haptic drive signal 501 of FIG. 5A is generated. Generating periodic haptic effects is discussed in more detail in U.S. patent application Ser. No. 13/665,526, titled "Method and Apparatus for Simulating Surface Features on a User Interface with Haptic Effects," filed Oct. 31, 2012, the entire content of which is incorporated herein by reference.

The hidden control 110 may be further configured to change the state of a physical or digital system. For example, the system may also include a mechanism configured to convert a digital command into a physical instantiation, such as unlocking a door.

Figure 6:
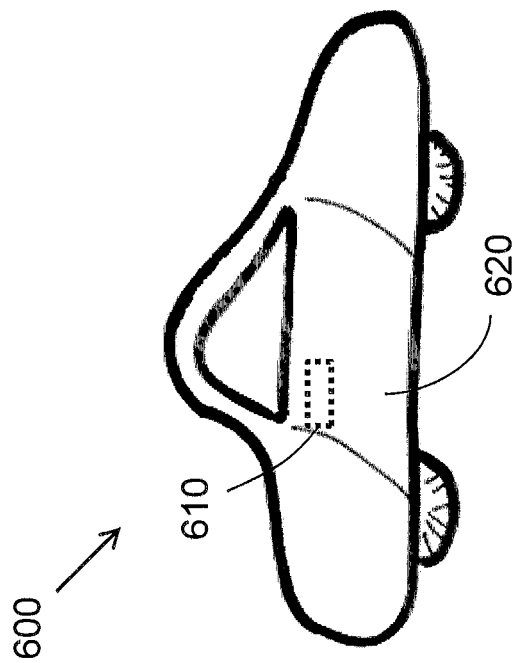
FIG. 6 schematically illustrates an implementation of the system of FIG. 1, in accordance with an embodiment of the invention.

FIG. 6 illustrates a vehicle 600 that includes a hidden control 610 in place of a conventional door handle that may be used to open a door 620 of the vehicle 600. By replacing the conventional door handle with a hidden control in accordance with embodiments of the invention, the vehicle 600 may be designed to have very clean lines by completely removing the door handles and replacing the door handles with touch panels that include the hidden control 610. Haptic feedback provided by the hidden control 610 makes it possible for the user of the vehicle 600 to find and operate the virtual door handle in a satisfying manner. In an embodiment, the hidden control may be in the form of a switch for the ignition of car and may be configured to require the car operator to activate a hidden control that is invisible but may be felt by touch.

Figure 7:
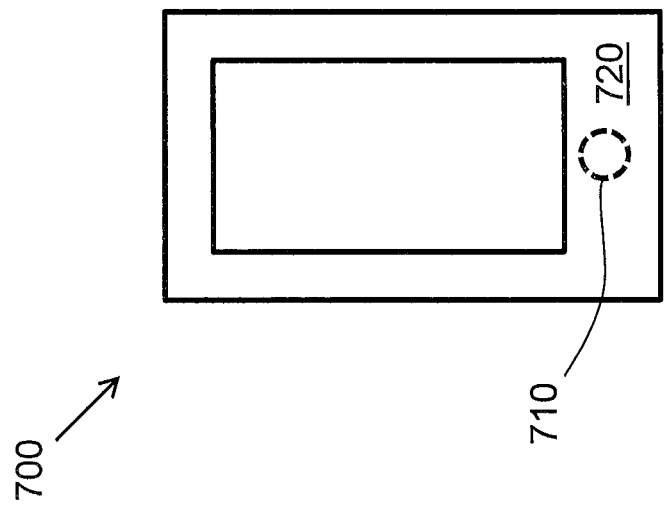
FIG. 7 schematically illustrates an implementation of the system of FIG. 1, in accordance with an embodiment of the invention.

FIG. 7 illustrates an electronic device 700, which may be, for example, a smartphone or tablet that includes a hidden control 710 in accordance with embodiments of the invention. In an embodiment, the hidden control 710 may be in the form of a virtual button on a front panel of the electronic device 700 instead of a physical button, which may give the electronic device 700 a clean look, without moving parts. The hidden control 710, i.e. virtual button in this embodiment, is not visible but may be felt by the user through haptic feedback, as described above, on a surface 720 of the electronic device 700.

Figure 8:
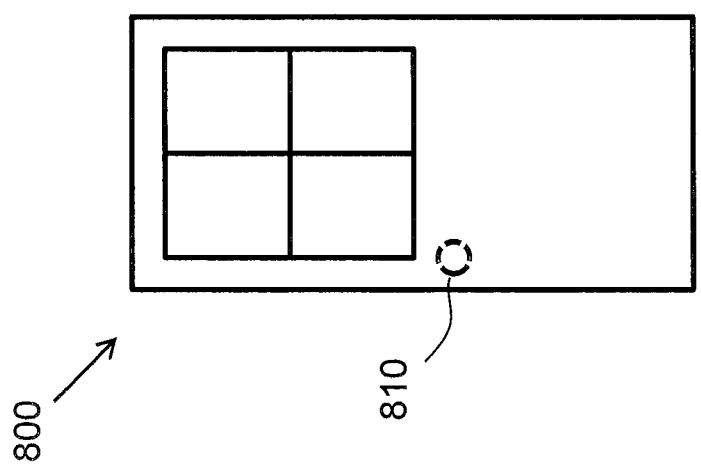
FIG. 8 schematically illustrates an implementation of the system of FIG. 1, in accordance with an embodiment of the invention.

FIG. 8 illustrates a door 800 that may include a hidden control 810 in place of a physical door knob, which may make the control for opening the door 800 more difficult to find without looking suspicious. When a user approaches the door 800 to open the door, the user may already know the location of the hidden control 810 and touch the location of the hidden control 810. As the user applies a gesture to the hidden control 810, such as drawing a circle to simulate turning a doorknob, haptic feedback may be generated to provide confirmation to the user that the hidden control 810 is being properly manipulated. Upon completion of the predetermined gesture, the hidden control 810 actuates a mechanism in the door 800 that is configured to unlock the door 800 and allow the door 800 to be opened.

Figure 9:
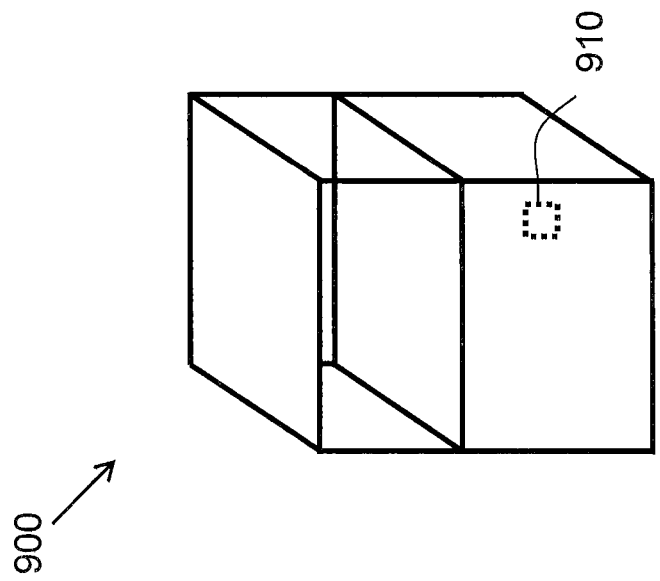
FIG. 9 schematically illustrates an implementation of the system of FIG. 1, in accordance with an embodiment of the invention.

FIG. 9 illustrates a display case 900 for use in a museum or a store, for example, that includes a hidden control 910 in the form of a hidden handle known only to the staff to access the items in the display case 900. The display case 900 may have a more pleasant look for visitors but still be functional for staff to access the item(s) in the display case 900. When a user approaches the display case 900 to open the display case, the user may already know the location of the hidden control 910 and touch the location of the hidden control 910. In an embodiment, even if the user does not know the precise location of the hidden control 910, if the user is an authorized user, the hidden control 910 may generate a haptic effect to assist the user to locate the hidden control 910, as described above. As the user applies a gesture to the hidden control 910, haptic feedback is generated to provide confirmation to the user that the hidden control 910 is being properly manipulated. Upon completion of the predetermined gesture, the hidden control 910 actuates a mechanism in the display case 900 that is configured to unlock the display case 900 and allow the display case 900 to be opened.

In an embodiment, the hidden control may be in the form of a silent alarm in a bank that may be triggered by activating the hidden control that may be located with haptic feedback. Such a, hidden control may be provided on the top of a desk or counter where the bank employee's hands are typically located so that the triggering of the silent alarm may be completely unnoticeable to others.

In an embodiment, the hidden control may be in the form of a dial of a safe, which may be hidden from sight, but found by touching the appropriate location on a surface of the safe, thereby making it difficult for a thief to find.

Embodiments of the invention make it possible to use hidden controls with minimal compromise on usability, which may improve the aesthetics and security of certain devices and spaces. Embodiments of the present invention may be used to increase security, because a hidden control may be difficult to locate, or its existence may even be unknown, without prior information. This may reduce the risk of an unauthorized person accessing the control without detection. For example, the dial for a safe may be hidden on a featureless wall, thereby making it difficult to locate by a thief.

Embodiments of the present invention may provide a hidden control for a space that only needs to be accessed by a few people and is completely hidden from view for all others. For example, a supply closet in a public space may be hidden from all but the persons needing to access the supply closet, thereby making the space more pleasant for visitors.

The embodiments described herein represent a number of possible implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

What is claimed is:

1. A system configured to determine if a user has permission to activate a hidden control, the system comprising:
    a user identification device configured to determine an identity of the user to generate an identified user;
    a hidden control, at least a portion of the hidden control being a physical mechanism, the hidden control configured to be at least substantially invisible to a human eye, the hidden control being a lock, and activation of the hidden control including unlocking the lock;
    a touch sensor configured to sense a touch input applied to a touch surface by the user, the touch surface being located proximal to a location of the hidden control, and the touch input including a gesture;
    a haptic output device configured to generate
        a first haptic effect to identify a location of the hidden control for the identified user if the identified user is permitted to activate the hidden control, and
        a second haptic effect to confirm that the touch input corresponds to a predetermined gesture; and
    a processor configured to
        determine if the identified user is permitted to activate the hidden control, and initiate actuation of the haptic output device to generate the first haptic effect upon determining that the identified user is permitted to activate the hidden control, and
        determine if the touch input corresponds to the predetermined gesture, and initiate actuation of the haptic output device to generate the second haptic effect upon determining that the touch input corresponds to the predetermined gesture.

2. The system of claim 1, wherein the haptic output device comprises an actuator.

3. The system of claim 1, wherein the haptic output device comprises a non-mechanical or non-vibratory device.

4. The system of claim 1, wherein the haptic output device is configured to generate electrostatic friction or ultrasonic surface friction.

5. The system of claim 1, wherein the processor is further configured to activate the hidden control if the touch input corresponds to the predetermined gesture.

6. The system of claim 1, wherein the user identification device is configured to sense a radio frequency identification tag.

7. The system of claim 1, wherein the user identification device comprises a biometric sensor.

8. The system of claim 1, wherein the first and second haptic effects comprise electrostatic friction or ultrasonic surface friction.

9. The system of claim 1, wherein the first haptic effect is not generated so that the location of the hidden control remains undetectable if the identified user is not permitted to activate the hidden control.

10. A method for determining if a user has permission to active a hidden control, the method comprising:
    determining an identity of the user to generate an identified user;
    determining if the identified user is permitted to activate the hidden control;
    generating a first haptic effect to identify a location of the hidden control for the identified user if the identified user is permitted to activate the hidden control;
    sensing, by a touch sensor, a gesture applied to a touch surface by the user,
        the touch surface being located proximal to the hidden control,
        the touch sensor and the hidden control being substantially invisible to a human eye, and
        at least a portion of the hidden control being a physical mechanism;
    determining if the gesture corresponds to a predetermined gesture, the predetermined gesture being associated with activation of the hidden control; and
    generating a second haptic effect to confirm that the gesture corresponds to the predetermined gesture,
    the hidden control being a lock where the activation of the hidden control includes unlocking the lock.

11. The method of claim 10, wherein the first and second haptic effects are generated with a haptic output device.

12. The method of claim 10, wherein the first and second haptic effects comprise a vibration.

13. The method of claim 10, wherein the first and second haptic effects comprise electrostatic friction or ultrasonic surface friction.

14. The method of claim 10, further comprising
    activating the hidden control if the gesture corresponds to the predetermined gesture.

15. The method of claim 10, wherein the identity of the user is determined by detecting a radio frequency identification tag within a vicinity of the hidden control.

16. The method of claim 10, wherein the identity of the user is determined with a biometric sensor.

17. The method of claim 10, wherein the first haptic effect is not generated so that the location of the hidden control remains undetectable if the identified user is not permitted to activate the hidden control.

* * * * *